(12) United States Patent
Agarwal et al.

(10) Patent No.: US 12,005,497 B2
(45) Date of Patent: Jun. 11, 2024

(54) BORON NITRIDE NANOTUBE ALUMINUM COMPOSITES AND METHODS OF MANUFACTURING THE SAME

(71) Applicant: The Florida International University Board of Trustees, Miami, FL (US)

(72) Inventors: Arvind Agarwal, Miami, FL (US); Cheng Zhang, Miami, FL (US); Tanaji Paul, Miami, FL (US); Sohail Mazher Ali Khan Mohammed, Miami, FL (US); Denny John, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/065,796

(22) Filed: Dec. 14, 2022

(65) Prior Publication Data

US 2023/0191479 A1    Jun. 22, 2023

Related U.S. Application Data

(60) Provisional application No. 63/265,401, filed on Dec. 14, 2021.

(51) Int. Cl.
*B22F 1/054* (2022.01)
*B22F 1/103* (2022.01)
(Continued)

(52) U.S. Cl.
CPC .......... *B22F 1/0547* (2022.01); *B22F 1/103* (2022.01); *B22F 10/64* (2021.01); *B33Y 10/00* (2014.12); *B33Y 30/00* (2014.12); *B33Y 70/10* (2020.01); *B82Y 30/00* (2013.01); *B82Y 40/00* (2013.01); *C22C 21/00* (2013.01); *B22F 2301/052* (2013.01); *B22F 2302/205* (2013.01); *B22F 2304/10* (2013.01)

(58) Field of Classification Search
CPC ... C22C 2026/003; C22C 47/14; C22C 47/16; C22C 47/18; C22C 49/06; C22C 49/14;
(Continued)

(56) References Cited

U.S. PATENT DOCUMENTS 10,941,464 B1    3/2021    Agarwal et al.
10,947,607 B1    3/2021    Agarwal et al.
(Continued)

FOREIGN PATENT DOCUMENTS

CN    112376042 A  *  2/2021
WO    WO-2021016666 A1  *  2/2021    .............. B22F 10/25

OTHER PUBLICATIONS

Nautiyal et al., "Non-equilibrium wetting and capture of boron nitride nanotubes in molten aluminum during plasma spray," Apr. 10, 2018, Scripta Materialia, vol. 151, pp. 71-75 (Year: 2018).*
(Continued)

*Primary Examiner* — Samir Shah
*Assistant Examiner* — Dean Mazzola
(74) *Attorney, Agent, or Firm* — Saliwanchik, Lloyd & Eisenschenk (57) ABSTRACT

Methods for large-scale additive manufacturing of high-strength boron nitride nanotubes (BNNT)/aluminum (Al) (e.g., reinforced Al alloy) metal matrix composites (MMCs) (BNNT/Al MMCs), as well as the BNNT/Al MMCs produced by the large-scale additive manufacturing methods, are provided. A combination of ultrasonication and spray drying techniques can produce good BNNT/Al alloy feedstock powders, which can be used in a cold spraying process.

10 Claims, 6 Drawing Sheets

(51) Int. Cl.

| | |
|---|---|
| *B22F 10/64* | (2021.01) |
| *B33Y 10/00* | (2015.01) |
| *B33Y 30/00* | (2015.01) |
| *B33Y 70/10* | (2020.01) |
| *B82Y 30/00* | (2011.01) |
| *B82Y 40/00* | (2011.01) |
| *C22C 21/00* | (2006.01) |

(58) Field of Classification Search
CPC ...... B22F 1/0547; B22F 1/0549; B22F 10/64; B22F 2301/052; B22F 2302/205; B22F 2304/10; B33Y 10/00; B33Y 30/00; B33Y 70/10; B82Y 30/00; B82Y 40/00
See application file for complete search history.

(56) References Cited

U.S. PATENT DOCUMENTS

| | | | |
|---|---|---|---|
| 11,131,007 | B1 | 9/2021 | Agarwal et al. |
| 11,148,201 | B2 | 10/2021 | Agarwal et al. |
| 2017/0355021 | A1* | 12/2017 | Agarwal ............... C22C 47/04 |
| 2019/0376169 | A1* | 12/2019 | Okai ..................... C22C 47/08 |
| 2020/0306869 | A1* | 10/2020 | Hardwick ............. B23K 20/10 |
| 2022/0266342 | A1* | 8/2022 | King ...................... B33Y 10/00 |

OTHER PUBLICATIONS

Norrell et al., "Synthesis and corrosion behavior of cold sprayed dual nanoparticle reinforced Al coatings," Aug. 11, 2020, Surface & Coatings Technology, vol. 401 (Year: 2020).*

Lahiri et al., "Insight into reactions and interface between boron nitride nanotube and aluminum," Nov. 14, 2012, Journal of Materials Research, vol. 27, No. 21, pp. 2760-2770 (Year: 2012).*

T. Laha et al., Synthesis and characterization of plasma spray formed carbon nanotube reinforced aluminum composite, Materials Science and Engineering A 381, pp. 249-258, 2004, 10 pages.

K. Balani et al., Transmission electron microscopy of cold sprayed 1100 aluminum coating, Scripta Materialia 53, pp. 845-850, 2005, 6 pages.

Srinivasa R. Bakshi et al., Carbon nanotube reinforced aluminum composite coating via cold spraying, Surface Coatings Technology, 202, pp. 5162-5169, 2008, 8 pages.

Pranjal Nautiyal et al., Directionally Aligned Ultra-Long Boron Nitride Nanotube Induced Strengthening of Aluminum-Based Sandwich Composite, Advanced Engineering Materials, 18, No. 10, 2016, 9 pages.

Pranjal Nautiyal et al., Oxidative Unzipping and Transformation of High Aspect Ratio Boron Nitride Nanotubes into "White Graphene Oxide" Platelets, Scientific Reports, 6, 29498, 2016, 8 pages.

Pranjal Nautiyal et al., In-situ mechanical investigation of the deformation of splat interfaces in cold-sprayed aluminum alloy, Materials Science & Engineering A 737, pp. 297-309, 2018, 13 pages.

Pranjal Nautiyal et al., In-situ creep deformation of cold-sprayed aluminum splats at elevated temperatures, Surface & Coatings Technology 372, pp. 353-360, 2019, 8 pages.

Debrupa Lahiri et al., Boron Nitride Nanotubes as Nanofillers/Reinforcement for Polymer, Ceramic, and Metal Matrix Composites, Chapter 18, Application and Functionalization of Nanotubes and Nanosheets, eds. I. Chen, CRC Press, USA, Mar. 2015, 30 pages.

* cited by examiner

BORON NITRIDE NANOTUBE ALUMINUM COMPOSITES AND METHODS OF MANUFACTURING THE SAME

CROSS-REFERENCE TO RELATED APPLICATION

This application claims the benefit of U.S. Provisional Application Ser. No. 63/265,401, filed Dec. 14, 2021, the disclosure of which is hereby incorporated by reference in its entirely, including all figures, tables, and drawings.

GOVERNMENT SUPPORT

This invention was made with government support under W911NF-20-2-0256 awarded by the Army Research Laboratory. The government has certain rights in the invention.

BACKGROUND

Aluminum (Al) is the most used metal in the world. High strength Al is in constant demand. The mechanical properties of Al can be improved by introducing different elements into the Al matrix to form Al alloys, such as Al 6061, Al 7075, and high entropy Al (HEA).

BRIEF SUMMARY

Embodiments of the subject invention provide novel and advantageous methods for large-scale additive manufacturing of high-strength boron nitride nanotubes (BNNT)/aluminum (Al) (e.g., reinforced Al alloy) metal matrix composites (MMCs) (BNNT/Al MMCs), as well as the BNNT/Al MMCs produced by the large-scale additive manufacturing methods. Cold spray technology, which is a solid-state three-dimensional (3D) printing process for metallic powders, can be used. Embodiments also provide methods for preparing the feedstock powder for the large-scale additive manufacturing methods. A combination of ultrasonication and spray drying techniques can produce good BNNT/Al alloy feedstock powders for the cold spray process.

In an embodiment, a method for fabricating a BNNT/Al MMC can comprise: preparing a BNNT-Al powder in which BNNTs are dispersed in a first powder comprising Al; and performing a cold spraying process with the BNNT-Al powder as a feedstock to fabricate the BNNT/Al MMC. The BNNTs can be uniformly (or substantially uniformly (e.g., at least 95% uniformly)) dispersed in the first powder. The first powder can be an Al powder or an Al alloy powder. The first powder can have a particle size of 5 micrometers ($\mu m$) or less. Alternatively, the first powder can have a particle size in a range of from 20 $\mu m$ to 50 $\mu m$. The performing of the cold spray process can comprise using a handheld cold spray gun (in which a user holds the handheld cold spray gun to perform the cold spraying process). Alternatively, the performing of the cold spray process can comprise using a cold spray gun that is attached to a robotic arm to 3D print (e.g., solid state 3D print) the BNNT/Al MMC. The robotic arm can be configured to move along and/or rotate about a number of axes (e.g., at least 3 axes or at least 6 axes). The preparing of the BNNT-Al powder can comprise mixing BNNTs and the first powder to give a first mixture, performing ultrasonication on the first mixture to give an intermediate mixture, optionally adding an optical binder (e.g., polyvinyl alcohol (PVA)) to the intermediate mixture, and performing a drying process on the intermediate mixture to give the BNNT-Al powder. The cold spraying process can be performed such that neither the temperature of the BNNT-Al powder nor the temperature of the BNNT/Al MMC exceeds 400° C. at any point during the cold spraying process.

In another embodiment, a BNNT/Al MMC fabricated by a method as disclosed herein can comprise BNNTs encapsulated inside of particles of a matrix comprising Al (e.g., an Al alloy matrix or an Al matrix). The BNNT/Al MMC can further comprise BNNT bridges and/or BNNT anchors within the matrix.

In another embodiment, a method of preparing a BNNT-Al powder can comprise: dispersing BNNTs in a first solvent (e.g., isopropyl alcohol (IPA)) to give a first solution; performing a sonication process (e.g., ultrasonication and/or tip sonication) on the first solution to give a first mixed solution; adding a first powder comprising Al to the first mixed solution to give a second solution; performing a sonication process (e.g., ultrasonication and/or tip sonication) on the second solution to give a second mixed solution; and drying the second mixed solution to give the BNNT-Al powder. The drying of the second mixed solution can comprise drying the second mixed solution in an oven (e.g., at a temperature of at least 75° C. (e.g., 80° C. or about 80° C.) for at least 4 hours (e.g., 6 hours or about 6 hours)) and/or spray drying the second mixed solution. The method can further comprise adding an optical binder (e.g., PVA) to the second mixed solution before drying the second mixed solution. The BNNT-Al powder can comprise BNNTs uniformly (or substantially uniformly) dispersed in the first powder. The first powder can be an Al alloy powder or an Al powder.

DETAILED DESCRIPTION

Embodiments of the subject invention provide novel and advantageous methods for large-scale additive manufacturing of high-strength boron nitride nanotubes (BNNT)/aluminum (Al) (e.g., reinforced Al alloy) metal matrix composites (MMCs) (BNNT/Al MMCs), as well as the BNNT/Al MMCs produced by the large-scale additive manufacturing methods. Cold spray technology, which is a solid-state three-dimensional (3D) printing process for metallic powders, can be used. Embodiments also provide methods for preparing the feedstock powder for the large-scale additive manufacturing methods. A combination of ultrasonication and spray drying techniques can produce good BNNT/Al alloy feedstock powders for the cold spray process.

Al is the most used metal in the world, and high strength Al is always in demand. The mechanical properties of Al can be improved by introducing different elements into the Al matrix to form Al alloys, such as Al 6061, Al 7075, and high entropy Al (HEA). In order to further improve the strength of Al alloys, reinforcing materials can be added to produce MMCs. BNNTs are a one-dimensional tubular material, and as with carbon nanotubes (CNTs), BNNTs possess exceptional mechanical properties and are considered a reinforcing material. Unlike CNTs, BNNTs have superior thermal stability up to 1000° C., compared to 400° C. in the case of CNTs. While the applications of CNTs have been primarily limited to polymeric materials, the high thermal stability of BNNTs enables them to be used in MMCs, such as with Al. BNNTs are effective at reinforcing Al alloy matrices.

Integrating BNNTs into Al and large-scale production of BNNT-reinforced Al alloy MMCs is quite challenging. The related art only attempts to study BNNT-reinforced Al alloy MMCs on a laboratory scale, which is far from commercialization and industrial production. Embodiments of the subject invention provide comprehensive technological solutions for large-scale additive manufacturing of high-strength BNNT-reinforced Al alloys by a cold spraying technique. The cold spray technique is a solid-state 3D printing process for metallic powders. Compared to the conventional laser-based 3D printing process, cold spraying utilizes a much lower temperature without melting the feedstock materials. This is significant for Al alloys as the most used Al alloys are wrought alloys, such as Al 6061 and Al 7075. The mechanical properties for these wrought alloys are obtained by the additional cold work that has been performed on the alloys. Melting of such alloys would diminish the cold work effects and result in less desired products.

Feedstock powders travel at 1000 meters per second (m/s) (or about 1000 m/s or at least 1000 m/s) in cold spraying and are severely deformed upon impact. Deformation leads to bonding between the particles, thereby forming desired structures. The cold spray process can retain the pristine properties of the Al alloys, but the additional deformation also provides extra strengthening to them without any oxidation or melting. In order to fabricate BNNT-reinforced Al alloy MMCs, feedstock powders must be prepared. The feedstock powders require BNNTs 10 to be homogeneously dispersed in an Al alloy matrix. The bonding mechanism in cold spray requires the feedstock particles to achieve high momentum to cause deformation upon impact. However, BNNTs are unlikely to achieve high momentum on their own due to their low mass.

Figure 1:
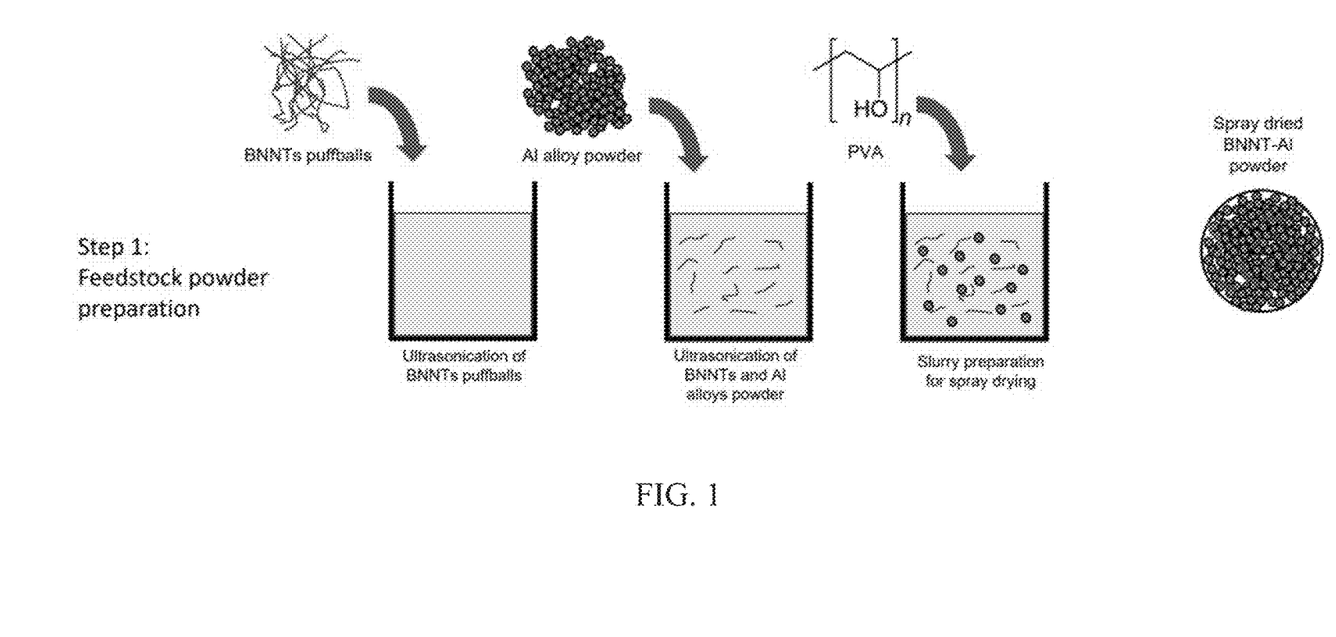
FIG. 1 shows a process flow for feedstock powder preparation, according to an embodiment of the subject invention.
Figure 2:
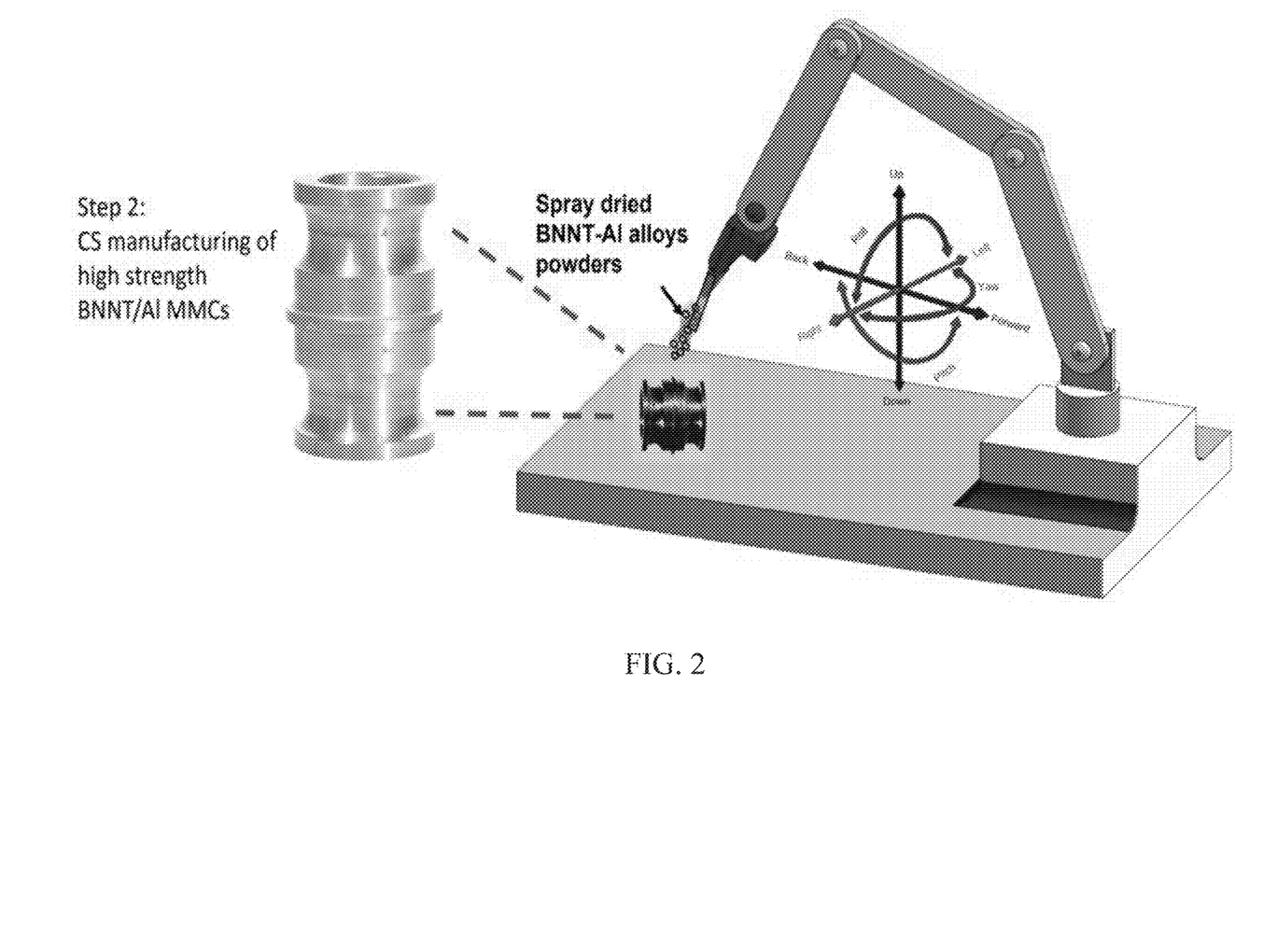
FIG. 2 shows a schematic view of a device for manufacturing of high-strength boron nitride nanotube (BNNT)/aluminum (Al) metal matrix composites (MMCs) (BNNT/Al MMCs), according to an embodiment of the subject invention.

Hence, dispersing BNNTs into an Al alloy matrix is not sufficient to achieve bulk MMCs. Embodiments of the subject invention can utilize a combination of ultrasonication mixing and a spray drying technique to uniformly disperse and encapsulate BNNTs into the Al alloy powder feedstock so that the BNNTs can be retained during the cold spray process (see FIG. 1). Both ultrasonication and spray drying techniques are large-scale processes. Ultrasonication is used to break down the entanglement of BNNTs and disperse them uniformly in the Al alloy powder matrices. The spray drying process glues Al particles and encapsulates the BNNTs inside of them. The resultant powders can be spherical, and the size of the particles can be, for example, in a range of from 20 micrometers (μm) to 50 μm, which is ideal for the cold spray process. Referring to FIG. 2, a cold spray system mounted on a robot (e.g., a robot with multiple (e.g., 3, 4, 5, 6, 7, 8, 9, or 10) axes of movement) can deposit Al-BNNT powders to form/print the desired shape quickly.

Embodiments of the subject invention provide a comprehensive solution for large-scale additive manufacturing of high-strength BNNT-reinforced Al alloy MMCs using cold spray technology, a solid-state 3D printing process for metallic powders. A combination of ultrasonication and spray drying techniques can be used to produce BNNT/Al alloy feedstock powders for the cold spray process. Embodiments have several advantages over the related art. Cold spray is a solid-state process, which means it can be used to manufacture wrought Al alloy-based MMCs without compromising the cold work effects. Cold work includes rolling, extrusion, and bending, which distorts the microstructures of Al alloys, so they are more difficult to deform (i.e., they have higher strength). However, melting of such alloys would completely diminish such distortion and lose the reinforcing effects. No melting occurs during cold spray according to embodiments of the subject invention (i.e., the process takes place at a temperature less than the melting temperature of the Al alloy (e.g., 0.6 times or less of the melting temperature of the Al alloy)), so the pristine powder properties can be retained. Another solid-state process is sintering, but sintering is limited by die size and shape. Cold spray techniques of embodiments of the subject invention can quickly scale up. With the aid of a robotic arm and turntable, cold spray techniques of embodiments of the subject invention can manufacture BNNT-reinforced Al MMCs of any size and shape. In addition, cold spray techniques of embodiments of the subject invention are portable and can provide service on-demand. Due to the low-temperature process, cold spraying can be handheld and applied directly to where needed. This can drastically reduce the turnaround time and cost.

In an embodiment, BNNT/Al alloy powder feedstock is prepared and then cold sprayed. Al powders with a particle size of fewer than 5 μm can be chosen as a starting powder. Commercially available BNNTs typically come in the form of puffballs, so ultrasonication can be used to break down the entanglement of BNNT puffballs. Al powder can be added to a solution of the BNNTs, and ultrasonication can be continued until uniform (or near uniform) dispersion of the BNNTs in the Al powder is achieved. An optional binder (e.g., polyvinyl alcohol (PVA)) can be added to improve the spray drying process. The resultant BNNT/Al alloy feedstock powder granules should be spherical and 20 μm to 50 μm in size, ideal for the cold spray. A cold spray gun can be either attached to a robotic arm to 3D print desired geometry parts (see FIG. 2) or handheld and applied to where needed in the field. BNNTs are similar to CNTs in geometry and mechanical properties (but with better thermal stability), and the BNNT/Al alloy feedstock powder can be cold sprayed to form a 3D printed part of the BNNT/Al MMC.

Al and its alloys are lightweight and high-strength materials, which are widely used worldwide. The addition of BNNTs further improves the strength of Al and its alloys. Cold spray 3D printing has been successfully applied in component repairs for the army. With the aid of a robotic arm, the BNNT-reinforced Al alloy MMCs can be applied to any surface with different geometries. The repair quality can be improved compared to new Al alloys, and the service life of a repaired structure can be extended. Corrosion protection is an application for BNNT-reinforced Al alloy MMCs of embodiments of the subject invention, which can be applied to ships, yachts, and cruise ships to restore the corroded parts and protect against further corrosion from seawater. Further the addition of boron and nitrogen makes the BNNT-reinforced Al alloy MMCs a perfect candidate for radiation shielding against solar flares and neutron radiations. This is of great importance to NASA's Artemis program for returning to the Moon. A functional protecting layer of BNNT-reinforced Al alloy MMCs could be readily applied using the cold spray 3D printing technique. BNNT-reinforced Al alloy MMCs of embodiments of the subject invention can also be useful in the commercial aviation sector and the automobile industry.

Embodiments of the subject invention have certain features in common with U.S. Pat. Nos. 10,941,464, 10,947,607, and 11,148,201, all of which are hereby incorporated by reference in their entireties.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Feedstock preparation (of BNNT/Al alloy powder) and cold spraying of BNNT/Al alloy powder was performed. Al powder with a particle size of fewer than 5 μm was chosen as starting powder. Commercially available BNNTs typically come in the form of puffballs. First, ultrasonication was used to break down the entanglement of BNNTs puffballs. Second, Al powder was added to the BNNTs solution, and ultrasonication was continued until uniform dispersion of BNNTs was achieved. Third, polyvinyl alcohol (PVA) was added as a binder for the spray drying process. The resultant powders were spherical and 20 μm to 50 μm in size, ideal for the cold spray. Dispersion of BNNT from clustered puffball to a metal powder surface was demonstrated.

A cold spray gun can be either attached to a (six-axis) robotic arm to 3D print desired geometry parts or handheld and applied to where needed in the field. FIG. 2 shows a schematic of the device that can be used. The BNNT/Al alloy powder was cold sprayed to form a 3D printed part of BNNT/Al alloy composite.

Example 2

A BNNT/Al composite coating was deposited using a cold spraying technique to demonstrate the potential and feasibility of using cold spraying to fabricate a bulk structure. The survival and retention of BNNTs after being cold sprayed was successfully achieved. The interface between the BNNTs and the Al matrix was intact without segregation. The coating was dense and displayed the signs of reinforcing mechanisms from BNNTs, such as anchoring and bridging. The results suggest that the cold spraying additive manufacturing (CSAM) is an effective technique for manufacturing advanced metallic composites with improved properties.

In detail, an Al 1100 powder and BNNT puffballs were used as starting materials. Al 1100 (H30) alloy powder was obtained from Valimet Inc. Stockton, CA. It is a spherical particle with an average particle size of 22 μm. BNNT puffballs were obtained from BNNT, LLC. The puffballs were made of entangled long BNNTs with an average length of 100 μm.

Powder preparation is crucial for the cold spraying process. The dispersion of BNNTs should be uniform (or close to uniform (e.g., greater than 95% uniformity)). Due to the low mass of individual BNNTs and their ceramic nature, BNNTs alone cannot be deposited by cold spraying. In order to achieve a BNNT-Al composite coating, BNNTs must be well-adhered to Al powders. Flowability is also important in preparing a composite powder. The mixed BNNT-Al powder should have a similar flowability as the pristine Al to ensure continuous powder feeding during cold spraying. The mixed powders were prepared with five simple steps. The entire process can be easily scaled up for large scale manufacturing.

Figure 3A:
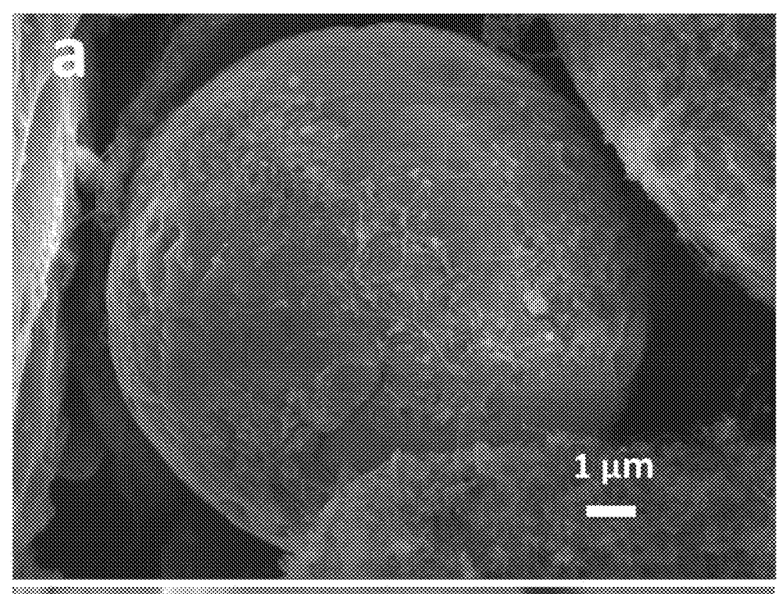
FIG. 3a shows a scanning electron microscope (SEM) image of BNNT-Al powder, in which the BNNTs are dispersed and decorated on Al powder. The scale bar is 1 micrometer ($\mu m$).
Figure 3B:
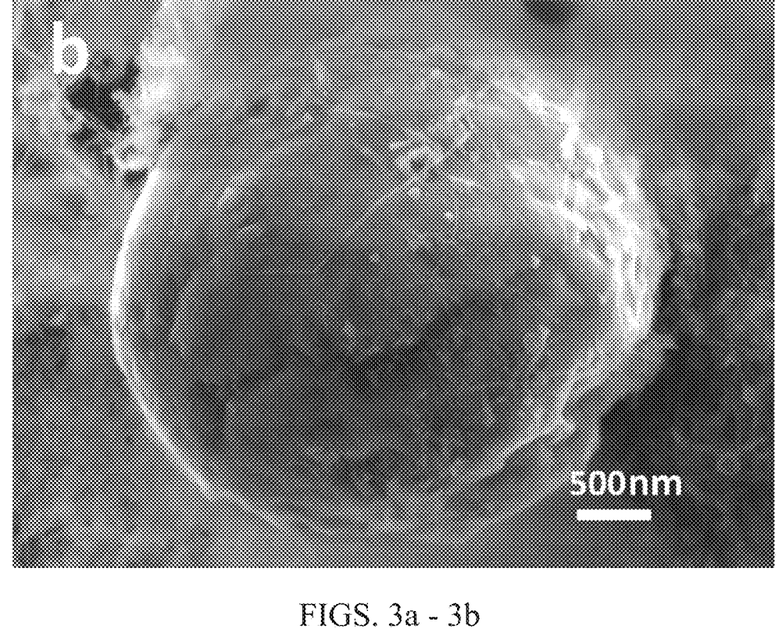
FIG. 3b shows an SEM image of BNNT-Al powder, in which some degree of embedment of the BNNTs in the Al powder can be seen. The scale bar is 500 nanometers (nm).

In a first step, 30 milligrams (mg) of BNNTs were dispersed in isopropyl alcohol (IPA) for 30 min using a tip sonication method. In a second step, 6 grams of H30 Al alloy powder was added to the dispersed BNNT-IPA solution and further tip sonicated for 10 mins to prepare the BNNT-Al composite powder. In a third step, the mixed powder was dried in oven at 80° C. for 6 hours. In a fourth step, an additional 9 grams of Al H30 powder was added to the BNNT-Al powders and vigorously mixed by hand mixing. In a fifth step, a total of 15 grams of 2 wt % BNNT-Al powder was prepared for cold spraying. FIGS. 3a and 3b show scanning electron microscope (SEM) images of the BNNT-Al powder.

Figure 4:
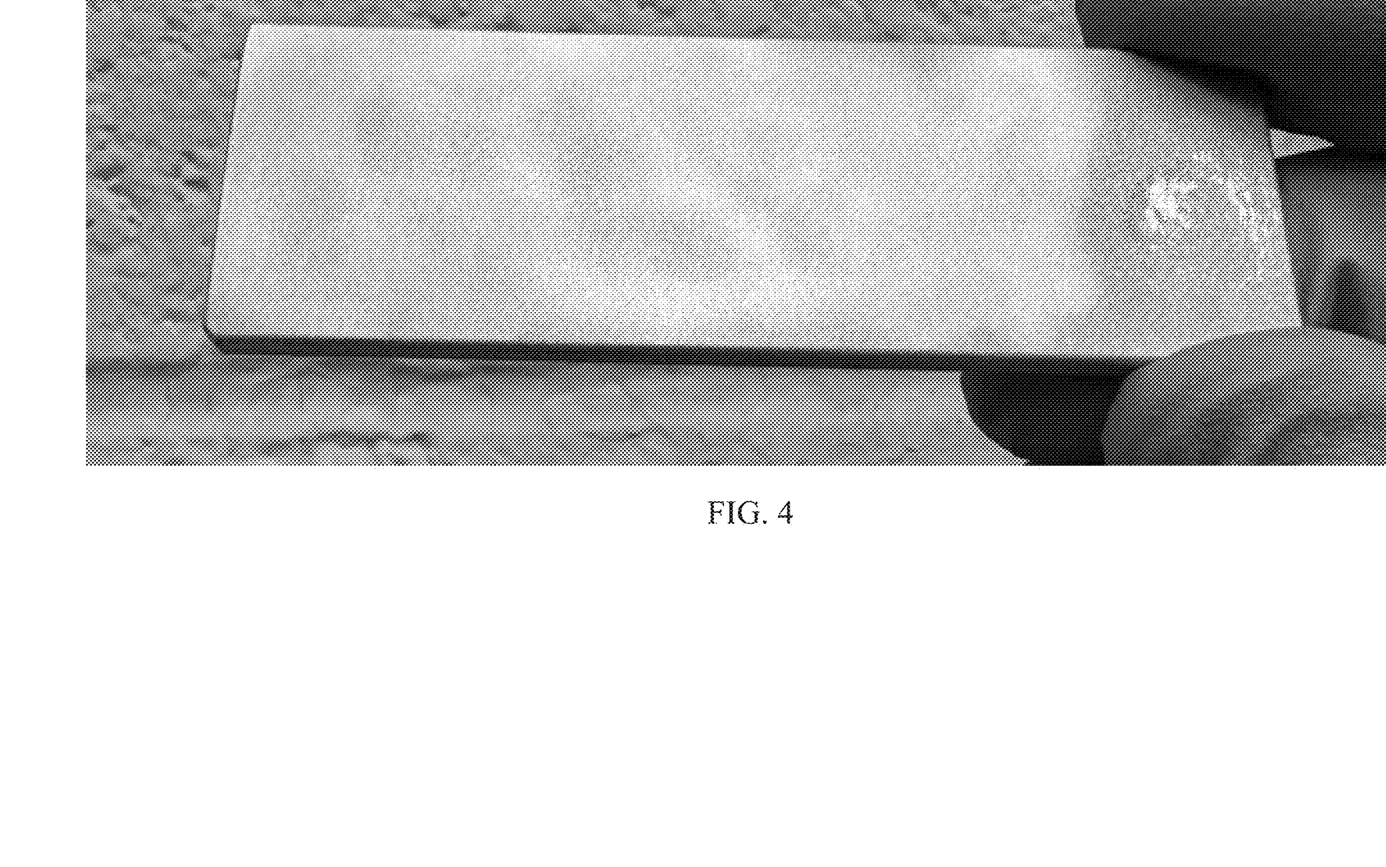
FIG. 4 shows an image of a BNNT/Al MMC coating achieved by a cold spray additive manufacturing (CSAM) technique, according to an embodiment of the subject invention.
Figures 5A, 5B, 5C:
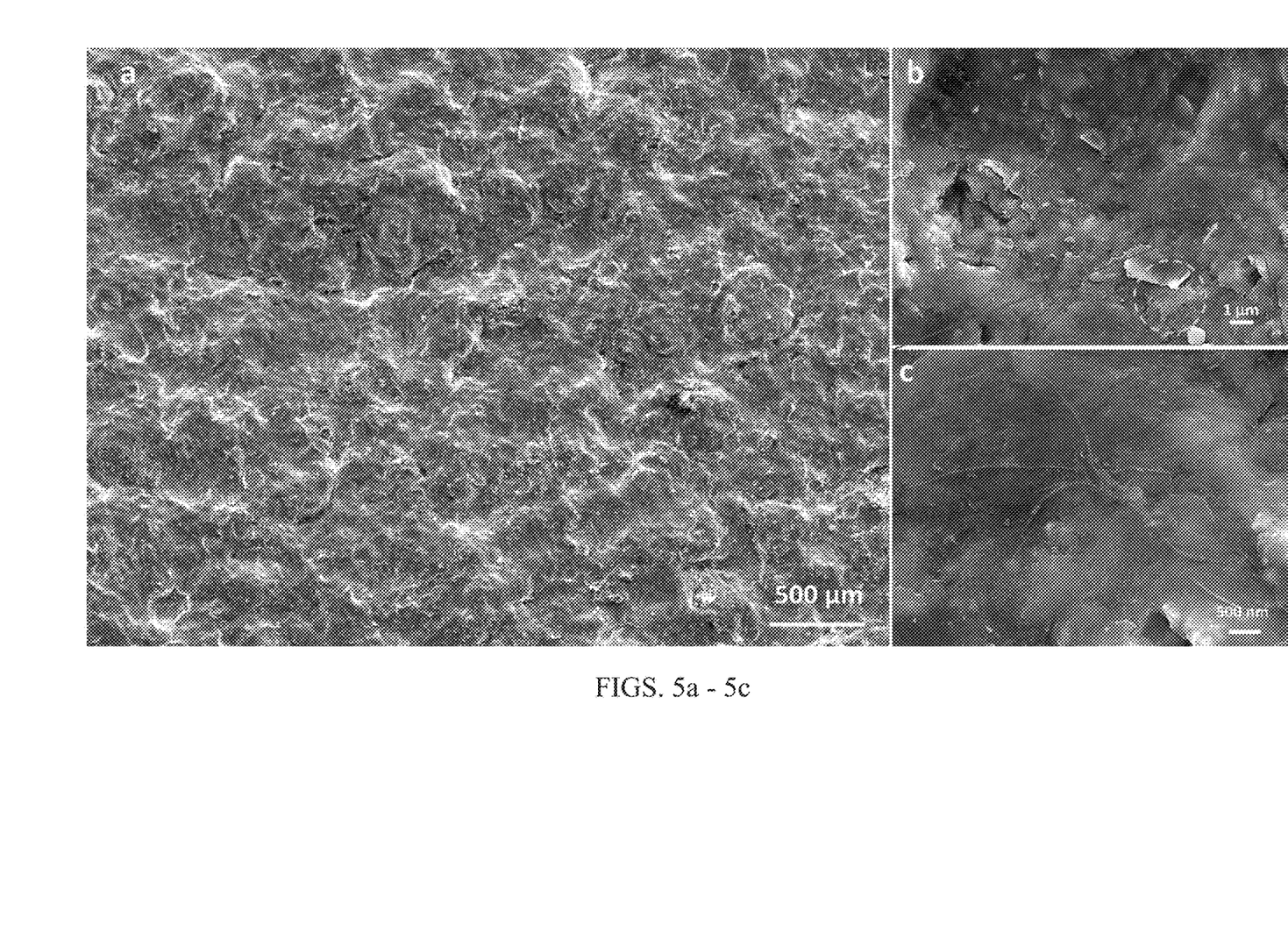
FIG. 5a shows an SEM image of a top surface of a BNNT/Al MMC coating achieved by CSAM. The scale bar is 500 $\mu m$.
FIG. 5b shows an SEM image of a top surface of a BNNT/Al MMC coating achieved by CSAM, in which BNNTs can be seen (identified by the arrows). The scale bar is 1 $\mu m$.
FIG. 5c shows an enlarged SEM image of the dotted box in FIG. 5b. The scale bar is 500 nm.
Figures 6A, 6B, 6C:
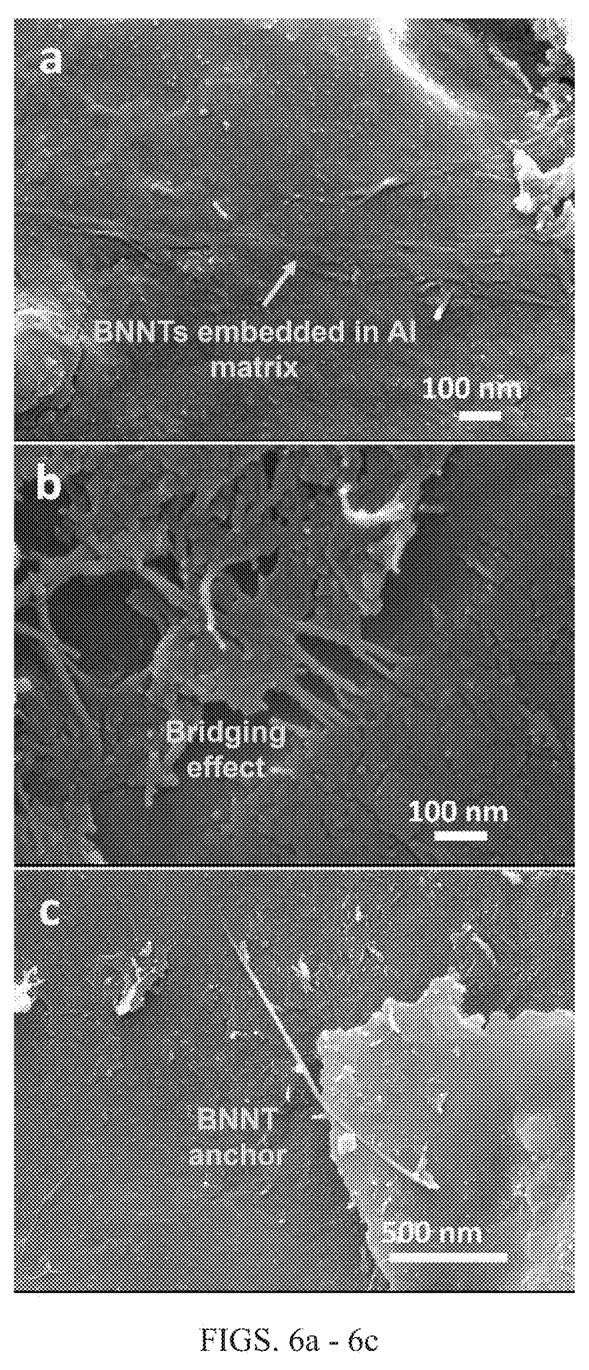
FIG. 6a shows an SEM image of a BNNT/Al MMC, in which BNNTs can be seen embedded in the Al matrix (identified by the arrow). The scale bar is 100 nm.
FIG. 6b shows an SEM image of a BNNT/Al MMC, in which the bridging effect (BNNTs bridge inside the Al matrix) can be seen (identified by the label). The scale bar is 100 nm.
FIG. 6c shows an SEM image of a BNNT/Al MMC, in which a BNNT anchor on the Al matrix can be seen (identified by the label). The scale bar is 100 nm.

The flowability of both pristine Al and BNNT-Al powders were measured by a Hall flow meter. There were no significant changes in the flowabilities for both powders. The CSAM was carried out by a handheld cold spraying machine (CSM 108) from Dymet, Estonia with a peak temperature of 400° C. Compressed air was used as carrier gas, and the maximum gas pressure was set to be 6 bar. The coating thickness was measured at 50 μm. The coating is shown in FIG. 4. Referring to FIG. 5a, the top surface SEM image shows a dense coating was achieved by CSAM. BNNTs can be easily spotted in FIGS. 5b and 5c suggesting a good survival and retention rate of BNNTs after cold spraying. Further SEM analysis of the BNNT-Al coating revealed that BNNTs were embedded in the Al matrix, indicating a good bonding between BNNTs and Al (see FIG. 6a). Referring to FIGS. 6b and 6c, reinforcing mechanisms such as bridging and anchoring were also present.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including in the "References" section, if any) are incorporated by reference in their entirety, including all figures and tables, to the extent they are not inconsistent with the explicit teachings of this specification.

What is claimed is:

1. A method for fabricating a boron nitride nanotubes (BNNT)/aluminum (Al) metal matrix composite (MMC), the method comprising:
    preparing a BNNT-Al powder in which BNNTs are dispersed in a first powder comprising Al; and
    performing a cold spraying process with the BNNT-Al powder as a feedstock to fabricate the BNNT/Al MMC, the preparing of the BNNT-Al powder comprising dispersing BNNTs in isopropyl alcohol (IPA) to give a BNNT-IPA solution free of Al, adding the first powder comprising Al to the BNNT-IPA solution to give a first mixture, performing tip sonication on the first mixture to give an intermediate mixture, and performing a drying process on the intermediate mixture to give the BNNT-Al powder.

2. The method according to claim 1, the BNNTs being uniformly dispersed in the first powder.

3. The method according to claim 1, the first powder being an Al alloy powder.

4. The method according to claim 1, the first powder having a particle size of 5 micrometers (μm) or less.

5. The method according to claim 1, the first powder having a particle size in a range of from 20 μm to 50 μm.

6. The method according to claim 1, the performing of the cold spray process comprising using a handheld cold spray gun.

7. The method according to claim 1, the performing of the cold spray process comprising using a cold spray gun that is attached to a robotic arm to three-dimensional (3D) print the BNNT/Al MMC.

8. The method according to claim 7, the robotic arm being configured to move along or rotate about a number of axes, the number of axes being at least three.

9. The method according to claim 8, the number of axes being at least six.

10. The method according to claim 1, the cold spraying process being performed such that a temperature of the BNNT-Al powder and a temperature of the BNNT/Al MMC does not exceed 400° C.

* * * * *